United States Patent
Lee (10) Patent No.: US 8,441,430 B2
(45) Date of Patent: *May 14, 2013

(54) IMAGE DISPLAY DEVICE

(75) Inventor: Juyoung Lee, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 161 days.

This patent is subject to a terminal disclaimer.

(21) Appl. No.: 12/955,348

(22) Filed: Nov. 29, 2010

(65) Prior Publication Data

US 2011/0205223 A1 Aug. 25, 2011

(30) Foreign Application Priority Data

Feb. 19, 2010 (KR) .................. 10-2010-0015331

(51) Int. Cl.
*G09G 3/36* (2006.01)

(52) U.S. Cl.
USPC .................................... 345/102; 345/419

(58) Field of Classification Search .................. 345/691, 345/102, 98–100, 419
See application file for complete search history.

(56) References Cited

U.S. PATENT DOCUMENTS

| | | | |
|---|---|---|---|
| 2005/0219188 A1* | 10/2005 | Kawabe et al. | 345/94 |
| 2006/0262055 A1* | 11/2006 | Takahara | 345/81 |
| 2007/0152934 A1* | 7/2007 | Maeda | 345/92 |
| 2007/0229447 A1* | 10/2007 | Takahara et al. | 345/102 |
| 2008/0079001 A1* | 4/2008 | Umezaki et al. | 257/59 |
| 2008/0170028 A1* | 7/2008 | Yoshida | 345/100 |
| 2008/0180385 A1* | 7/2008 | Yoshida et al. | 345/102 |
| 2009/0224245 A1* | 9/2009 | Umezaki | 257/59 |
| 2010/0103089 A1* | 4/2010 | Yoshida et al. | 345/102 |
| 2011/0227066 A1* | 9/2011 | Umezaki | 257/43 |
| 2011/0260169 A1* | 10/2011 | Umezaki et al. | 257/59 |

* cited by examiner

*Primary Examiner* — Ricardo L Osorio
(74) *Attorney, Agent, or Firm* — Morgan, Lewis & Bockius LLP

(57) ABSTRACT

An image display device comprises a liquid crystal display panel configured to selectively implement 2D images and 3D images, panel driving circuits configured to drive the liquid crystal display panel, a backlight configured to include a plurality of light sources and supply light to the liquid crystal display panel, and a controller configured to modulate input data to generate frame data synchronized with N (where N is a positive integer equal to or more than 4) multiple frame frequency, control the panel driving circuits such that the same frame data is displayed in the liquid crystal display panel every two consecutive frame periods, control the backlight to be turned off for a former frame period of the two frame periods allocated to display the same frame data, and control the backlight to be turned on for a latter frame period of the two frame periods.

10 Claims, 9 Drawing Sheets

IMAGE DISPLAY DEVICE

This application claims the priority and the benefit of Korea Patent Application No. 10-2010-15331 filed on Feb. 19, 2010, the entire contents of which is incorporated herein by reference for all purposes as if fully set forth herein.

BACKGROUND

1. Field

This document relates to an image display device capable of selectively implementing two-dimensional flat images (hereinafter, referred to as "2D images") and three-dimensional stereoscopic images (hereinafter, referred to as "3D images").

2. Related Art

An image display device implements 3D images using a stereoscopic technique and an autostereoscopic technique.

The stereoscopic technique uses binocular parallax images which are great in the stereoscopic effect. The stereoscopic technique has a type of using glasses and a type of not using glasses, and, at present, the two types have been put into practical use. In the type of not using glasses, the stereoscopic images are implemented by dividing optical axes of binocular parallax images, by using optical plates such as parallax barriers provided at front and rear surfaces of a display panel. In the type of using glasses (hereinafter, referred to as a "glasses type"), binocular parallax images are displayed on a direct view display panel or a projector by changing polarization directions or in the temporal division manner, and polarization glasses or liquid crystal shutter glasses are used to implement stereoscopic images.

The glasses type is greatly classified into a first polarization filter type using a pattern retarder film and polarization glasses, a second polarization filter type using a switching liquid crystal layer and polarization glasses, and a liquid crystal shutter glasses type. The first and second polarization filter types have a low transmittance of 3D images due to the pattern retarder film or the switching liquid crystal layer which functions as a polarization filter and formed in a liquid crystal display panel.

The liquid crystal shutter glasses type implements 3D images by alternately displaying a left eye image and a right image on a display device by the frame unit, and opening and closing the left and right eye shutters of the liquid crystal shutter glasses in synchronization with the display timing. In the liquid crystal shutter glasses, only the left eye shutter is opened for the n-th frame period when the left eye image is displayed, and only the right eye shutter is opened for the (n+1)-th frame period when the right eye image is displayed, thereby generating the binocular parallax in a time-divisional manner.

In order to selectively implement 3D images and 2D images, the latest image display device mainly employs a hold type display device such as a liquid crystal display ("LCD"). The LCD maintains data which has been charged for the previous frame period due to the response time of the liquid crystal which is relatively low, till new data is written therein.

When 3D images are implemented by the image display device, due to the response time delay characteristic of the liquid crystal, 3D crosstalk of a ghost pattern can be viewed for a time when the left eye image is changed to the right eye image or the right eye image is changed to the left eye image. A principle by which the 3D crosstalk is viewed will be described in outline.

If it is assumed that the left eye shutter of the liquid crystal shutter glasses is opened for the n-th frame period and the right eye shutter of the liquid crystal shutter glasses is opened for the (n+1)-th frame period, in the LCD, left eye image data is sequentially addressed for the n-th frame period and right eye image data is sequentially addressed for the (n+1)-th frame period. When the left eye shutter of the liquid crystal shutter glasses is being opened, a portion of pixels (pixels placed in the lower part of the panel, which lies in the latter addressing order) where the left eye image data for the n-th frame has not been written yet maintains the right eye image data which has already been written for the (n−1)-th frame period. Therefore, a viewer's left eye views a portion of the right eye image for the (n−1)-th frame along with the left eye image for the n-th frame in an overlapping manner. In addition, when the right eye shutter of the liquid crystal shutter glasses is being opened, a portion of pixels (pixels placed in the lower part of the panel, which lies in the latter addressing order) where the left eye image data for the (n+1)-th frame has not been written yet maintains the left eye image data which has already been written for the n-th frame period. Therefore, a viewer's right eye views a portion of the left eye image for the n-th frame along with the right eye image for the (n+1)-th frame in an overlapping manner.

In addition, when 2D moving pictures are implemented by the image display device, due to the maintaining characteristic of the liquid crystal, there may be occurrence of a motion blurring that a screen is not clear and appears blurred. In order to remove the motion blurring, it is necessary to improve a moving picture response time ("MPRT").

SUMMARY

Embodiments of this document provide an image display device capable of improving a display quality.

According to an exemplary embodiment of this document, there is provided an image display device comprising a liquid crystal display panel configured to selectively implement 2D images and 3D images, panel driving circuits configured to drive the liquid crystal display panel, a backlight configured to include a plurality of light sources and supply light to the liquid crystal display panel, and a controller configured to modulate input data to generate frame data synchronized with N (where N is a positive integer equal to or more than 4) multiple frame frequency, control the panel driving circuits such that same frame data are displayed in the liquid crystal display panel every two consecutive frame periods, control the backlight to be turned off for a former frame period of the two frame periods allocated to display the same frame data, and control the backlight to be turned on for a latter frame period of the two frame periods.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION

Hereinafter, embodiments of this document will be described with reference to FIGS. 1 to 9. Like reference numerals designate like elements throughout the specification.

Figure 1:
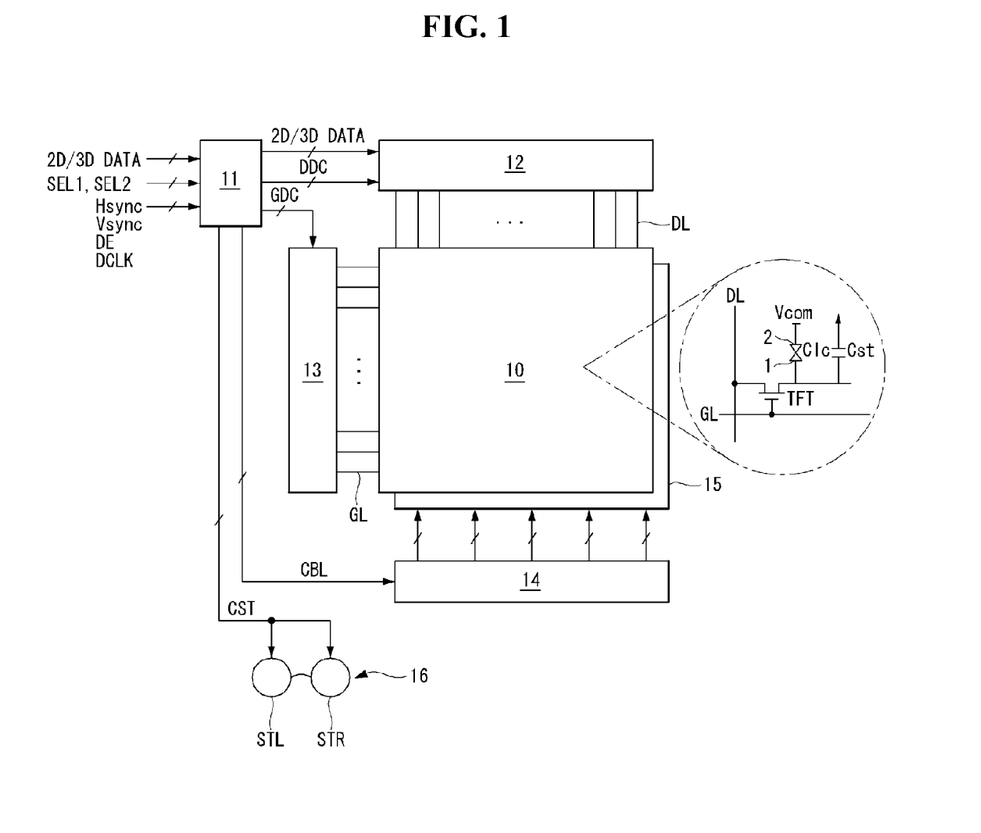
FIG. 1 is a block diagram illustrating an image display device according to an embodiment of this document.

FIG. 1 shows an image display device according to an embodiment of this document.

In FIG. 1, the image display device comprises a liquid crystal display panel 10, a controller 11, a data driver 12, a gate driver 13, a light source driver 14, a backlight unit 15, and liquid crystal shutter glasses 16. The data driver 12 and the gate driver 13 constitute a panel driving circuit.

The liquid crystal display panel 10 comprises two glass substrates and a liquid crystal layer interposed therebetween. The lower glass substrate of the liquid crystal display panel 10 is provided with a plurality of data lines DL and a plurality of gate lines GL intersecting the data lines DL. The liquid crystal display panel 10 is provided with liquid crystal cells Clc which are formed at the intersections of the data lines DL and the gate lines GL and arranged in a matrix. In addition, the lower glass substrate of the liquid crystal display panel 10 is provided with TFTs (thin film transistors), and pixel electrodes 1 and storage capacitors Cst connected to the TFTs. Black matrices, color filters, and common electrodes 2 are formed on the upper glass substrate of the liquid crystal display panel 10. The common electrodes are disposed on the upper glass substrate in a vertical electric field driving type such as a TN (twisted nematic) mode and a VA (vertical alignment) mode, and are disposed on the lower glass substrate along with the pixel electrodes in a horizontal electric field type such as an IPS (in plane switching) mode and an FFS (fringe field switching) mode. Polarizers are respectively attached to the outer surfaces of the lower and upper glass substrate of the display panel 10. In addition, alignment layers are formed on the inner surfaces having contact with the liquid crystal layer to set pretilt angles of the liquid crystal layer.

The data driver 12 comprises a plurality of data drive ICs. Each of the data drive ICs comprises a shift register for sampling clock signals, a register which temporarily stores digital data output from the controller 11, a latch which stores the amount of one line data in response to clock signals from the shift register and outputs the amount of one line data at a time, a digital/analogue converter which selects positive/negative gamma voltages by referring to a gamma reference voltage corresponding to the digital data values from the latch, multiplexers which select data lines DL which are applied with the analogue data converted as the positive/negative gamma voltages, and output buffers connected between the multiplexers and the data lines DL. The data driver 12 converts 2D and 3D data synchronized with a frame frequency of f (input frame frequency)×N (where N is a positive integer equal to or more than 4), into analogue data voltages for supply to the data lines DL.

The gate driver 13 comprises a plurality of gate drive ICs. Each of the gate drive ICs comprises a shift register, a level shifter which converts an output signal from the shift register to have a swing range suitable to drive the TFTs of the liquid crystal cells, and output buffers. The gate driver 13 sequentially outputs scan pulses (or gate pulses) synchronized with the frame frequency of f×N Hz for supply to the gate lines GL.

The light source driver 14 generates a driving power for turning on light sources. The light driver 14 supplies the driving power to the light sources at a specific cycle under the control of the controller 11.

The backlight unit 15 is turned on for a preset specific time to supply light to the liquid crystal display panel 10 and is turned off during the remaining time period, and repeats such turning-on and turning-off at a specific cycle. The backlight unit 15 comprises a plurality of light sources which are turned on depending on the driving power supplied from the light source driver 14, a light guide plate (or a diffusion plate), a plurality of optical sheets, and the like. The backlight unit 15 may be implemented by a direct type or an edge type. The light sources may comprise any one or more of HCFL (Hot Cathode Fluorescent Lamp), CCFL (Cold Cathode Fluorescent Lamp), EEFL (External Electrode Fluorescent Lamp), and LED (Light Emitting Diode).

The liquid crystal shutter glasses 16 comprise a left eye shutter STL and a right eye shutter STR which are electrically controlled independently from each other. Each of the left eye shutter STL and the right eye shutter STR comprises a first transparent substrate, a first transparent electrode formed on the first transparent substrate, a second transparent substrate, a second transparent electrode formed on the second transparent substrate, and a liquid crystal layer interposed between the first and second transparent substrates. The first transparent electrode is applied with a reference voltage, and the second transparent electrode is applied with ON and Off voltages. Under the control of the controller 11, each of the left eye shutter STL and the right shutter STR transmits light from the liquid crystal display panel 10 when the ON voltage is applied to the second transparent electrode, whereas it block light from the liquid crystal display panel 10 when the OFF voltage is applied to the second transparent electrode.

The controller 11 is supplied with timing signals and 2D and 3D data from a video source (not shown). The timing signals includes a vertical synchronizing signal Vsync, a horizontal synchronizing signal Hsync, a data enable signal DE, a dot clock DCLK, and so forth.

The controller 11 multiplies the input frame frequency f by N to generate a frame frequency (hereinafter, referred to as an "N multiple frame frequency") Nf and generates display panel control signals DDC and GDC, a light source control signal CBL, and a liquid crystal shutter control signal CST with respect to the frame frequency.

The display panel control signals DDC and GDC include a data control signal for controlling an operation timing of the data driver 12 and a gate control signal GDC for controlling an operation timing of the gate driver 13. The data control signal DDC includes a source start pulse SSP, a source sampling clock SSC, a source output enable signal SOE, a polarity control signal POL, and so on. The gate control signal GDC includes a gate start pulse GSP, a gate shift clock GSC, a gate output enable signal GOE, and the like. The light source control signal CBL controls the light driver 14 such that the light sources of the backlight unit 15 are turned on and off at a specific cycle. The liquid crystal shutter control signal CST enables the left eye shutter STL and the right eye shutter STR of the liquid crystal shutter glasses 16 to be alternately opened and closed at a specific cycle.

The controller 11 selects either the 2D data or the 3D data supplied from the video source in response to a first selection signal SEL1 and modulates it to be synchronized with the N multiple frame frequency Nf. When selecting the 2D data, the controller 11 may modulate the data through the data interpolation and the data doubling. Also, when selecting the 2D data, the controller 11 may select either a first modulation path comprising the data interpolation and the data doubling or a second modulation path comprising only the data interpolation in response to a second selection signal SEL2, and modulate the data via the selected modulation path. When selecting the 3D data, the controller 11 may modulate the data through the data division and the data doubling. The controller 11 may control the drivers 12 and 13 such that the same data is displayed every two consecutive frame periods. For this, the controller 11 may control the drivers 12 and 13 to repeatedly write the same frame data in the liquid crystal display panel 10 for two frame periods or to once write the data therein for the two frame periods. The controller 11 can reduce a time taken to write frame data by modulating a vertical blank interval and increasing data transmission frequency.

Hereinafter, the image display device according to various embodiments of this document will be described in detail with reference to FIGS. 2 to 9. Here, the embodiments will be described by exemplifying a case where "N" is 4, that is, a case where the frame frequency is 240 Hz when the input frame frequency is 60 Hz. In FIGS. 3 to 8, the reference numerals "A," "B," and "C" denote 2D data, and "L" and "R" denote 3D data.

Figure 2:
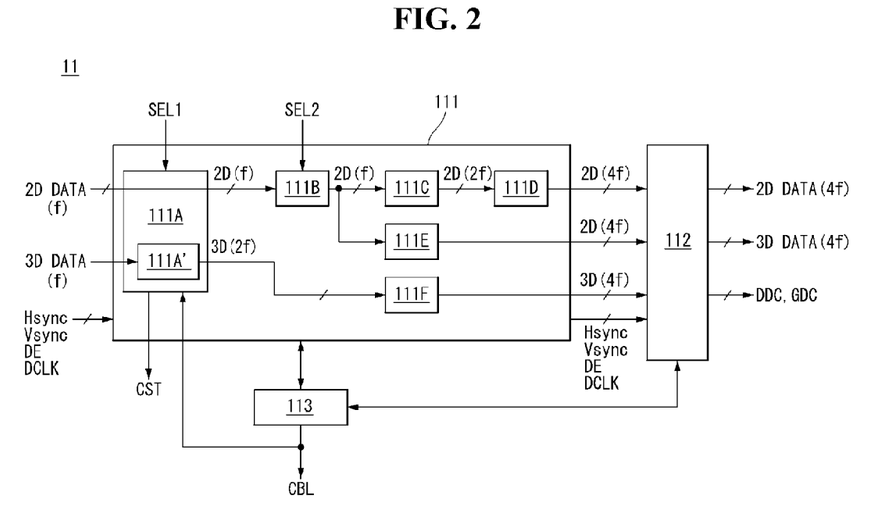
FIG. 2 is a block diagram illustrating an example of a controller.

FIG. 2 shows an example of the controller 11.

In FIG. 2, the controller 11 comprises a data processing unit 111, a timing controller 112, and a light source control unit 113.

The data processing unit 111 modulates input 2D and 3D data to be synchronized with the quadruple frame frequency 4f. For this, the data processing unit 111 comprises a data selection unit 111A, a first 2D data interpolation unit 111C, a 2D data doubling unit 111D, and a 3D data doubling unit 111F.

Responsive to a first logic level of the first selection signal SEL1, the data selection unit 111A bypasses the input 2D data and blocks the 3D data. Responsive to a second logic level of the first selection signal SEL1, the data selection unit 111A blocks the 2D data and processes the input 3D data for output. When processing the input 3D data, the data selection unit 111A divides the input 3D data into left eye data and right eye data by using a 3D formatter 111A', thereby outputting double 3D data synchronized with double frame frequency 2f. In addition, when processing the input 3D data, the data selection unit 111A determines frames based on counted values of the timing signal such as the vertical synchronizing signal Vsync or the like, and generates the liquid crystal shutter control signal CST for alternately opening and closing the left eye shutter STL and right eye shutter STR of the liquid crystal shutter glasses 16 at a cycle of two frame periods. Particularly, by referring to logic levels of the light source control signal CBL, the data selection unit 111A controls the liquid crystal shutter control signal CST such that the opening and closing of the shutters STL and STR can be decided at the same time while the light sources are turned off.

The first 2D data interpolation unit 111C interpolates the input 2D data which has been bypassed from the data selection unit 111A, to output double 2D data synchronized with the double frame frequency 2f. In order to interpolate the data, the first 2D data interpolation unit 111C inserts interpolated frame data into every interval between neighboring input frame data by referring to a memory (not shown).

The 2D data doubling unit 111D doubles the 2D data from the first 2D data interpolation unit 111C to output quadruple 2D data for supply to the timing controller 112. For doubling the data, the 2D data doubling unit 111D inserts doubling frame data into every interval between neighboring double frame data. Here, the doubling frame data means frame data having the same values as one of the neighboring double frame data.

The 3D data doubling unit 111F doubles the double 3D data from the data selection unit 111A to output quadruple 3D data for supply to the timing controller 112. For doubling the data, the 3D data doubling unit 111F inserts doubling frame data into every interval between neighboring double frame data.

In the meantime, the data processing unit 111 may further comprise a modulation path selection unit 111B and a second 2D data interpolation unit 111E. The second 2D data interpolation unit 111E interpolates the input 2D data which has been bypassed from the data selection unit 111A to output quadruple 2D data synchronized with the quadruple frame frequency 4f. For interpolating the data, the second 2D data interpolation unit 111E inserts three pieces of interpolated frame data into every interval between neighboring input frame data by referring to the memory. In response to the second selection signal SEL2, the modulation path selection unit 111B can select either a first modulation path passing through the first 2D data interpolation unit 111C and the 2D data doubling unit 111D, or a second modulation path passing through the second 2D data interpolation unit 111E.

The timing controller 112 rearranges the quadruple 2D data and the quadruple 3D data which are selectively output from the data processing unit 111, to be suitable for the resolution of the liquid crystal display panel 10. Also, the timing controller 112 repeatedly supplies the same frame data to the data driver 12 or once supplies the frame data thereto for two frame periods. The timing controller 112 generates the display panel control signals DDC and GDC synchronized with the quadruple frame frequency 4f based on the timing signals Vsync, Hsync, DE and DCLK, thereby controlling operations of the drivers 12 and 13. The timing controller 112 may control the drivers 12 and 13 such that they are paused for odd-numbered frame periods or even-numbered frame periods. Further, the timing controller 112 may modulate the data enable signal DE to widen the vertical blank interval and modulates the dot clock DCLK to increase the data transmission frequency. The modulation for the data enable signal DE and the dot clock DCLK may be carried out by an external system board (not shown).

The light source control unit 113 outputs the light source control signal CBL for controlling the turning-on and turning-off of the light sources. The light source control unit 113 reverses logic levels of the light source control signal CBL based on the timing signals Vsync, Hsync, DE and DCLK. The light source control unit 113 outputs the light source control signal CBL with a low level to turn off the light sources for a former frame period of two frame periods which are allocated to display of the same frame data, and outputs the light source control signal CBL with a high level to turn on the light sources for a latter frame period of the two frame periods. Particularly, in order to control the turned-on period of the light sources, the light source control unit 113 may output the light source control signal CBL with a high level at least one frame period later from an initial data addressing point (of time) in the former frame period, and maintain the high level till the latter frame period ends. The light source control unit 113 may be embedded in the data processing unit 111 or the timing controller 112.

Figure 3:
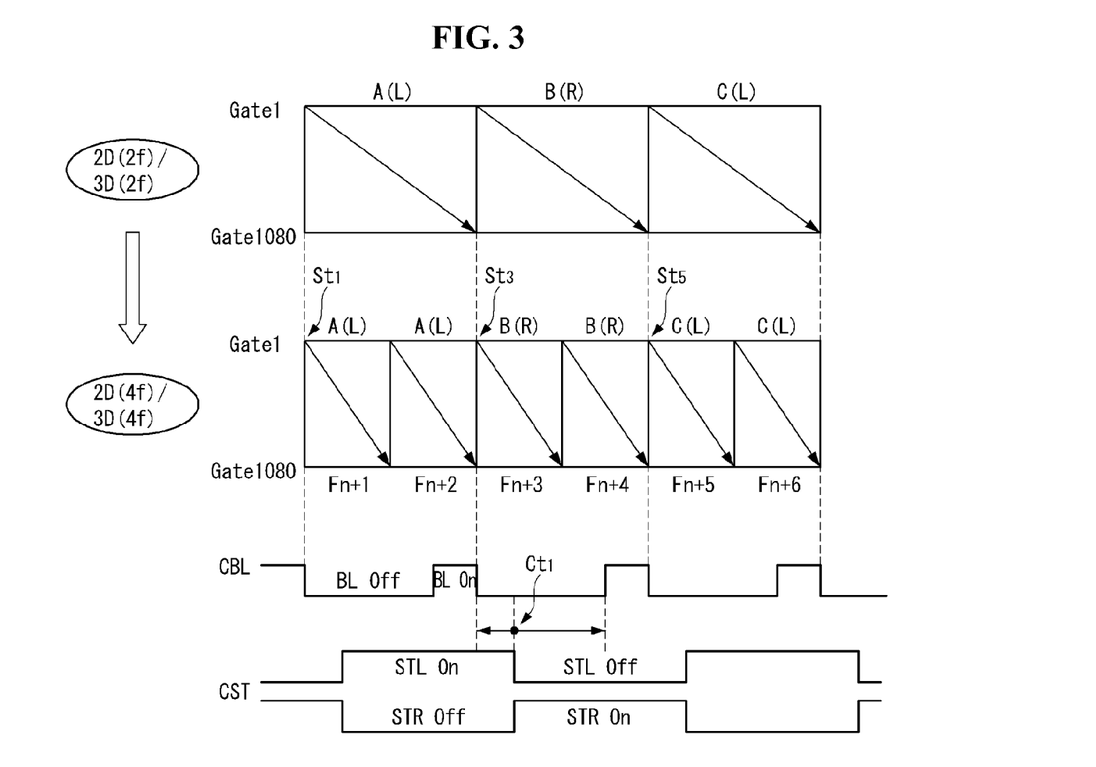
FIGS. 3 to 8 are diagrams illustrating various embodiments regarding driving timings of a light source control signal and a liquid crystal shutter control signal corresponding to addressing timings of frame data.

FIG. 3 shows a first embodiment of the light source control signal CBL and the liquid crystal shutter control signal CST corresponding to the addressing timing of the frame data.

In FIG. 3, when 2D images are implemented, the controller 11 controls the drivers 12 and 13 such that the same quadruple 2D data A is repeatedly addressed in the liquid crystal display panel 10 for the (n+1)-th and (n+2)-th frame periods Fn+1 and Fn+2, the same quadruple 2D data B is repeatedly addressed in the liquid crystal display panel 10 for the (n+3)-th and (n+4)-th frame periods Fn+3 and Fn+4, and the same quadruple 2D data C is repeatedly addressed in the liquid crystal display panel 10 for the (n+5)-th and (n+6)-th frame periods Fn+5 and Fn+6. The data addressing for the response of the liquid crystal is completed for each of the frame periods Fn+1, Fn+3 and Fn+5 (hereinafter, referred to as a "former frame period"). The response of the liquid crystal may be completed in the upper part of the liquid crystal display panel 10 which lies in the relatively former data addressing order, but the completion point of the response of the liquid crystal in the lower part of the liquid crystal display panel 10, which lies in the relatively latter addressing order, may be extended up to the (n+2)-th, (n+4)-th, and (n+6)-th frame periods Fn+2, Fn+4 and Fn+6 (hereinafter, referred to as a "latter frame period"). The reason why the same data A, B and C as the previous frame is repeatedly addressed for the latter frame periods is for compensating the stance maintaining force of the liquid crystal. The controller 11 controls the light sources to be turned on after 1.5 frame periods have elapsed from the initial data addressing point St1, St2 and St3 in the former frame periods till the latter frame periods end, in consideration of a time taken for all of the liquid crystal in the liquid crystal display panel 10 to complete its response due to the addressed data A, B and C for the former frame periods. As a result, when 2D images are implemented, the MPRT are greatly improved, and particularly, uniformity of the MPRT in the entire liquid crystal display panel 10 becomes better.

When 3D images are implemented, the controller 11 controls the drivers 12 and 13 such that the same quadruple 3D data L is repeatedly addressed in the liquid crystal display panel 10 for the (n+1)-th and (n+2)-th frame periods Fn+1 and Fn+2 (left eye frame periods), the same quadruple 3D data R is repeatedly addressed in the liquid crystal display panel 10 for the (n+3)-th and (n+4)-th frame periods Fn+3 and Fn+4 (right eye frame periods), and the same quadruple 3D data L is repeatedly addressed in the liquid crystal display panel 10 for the (n+5)-th and (n+6)-th frame periods Fn+5 and Fn+6 (left eye frame periods). The data addressing for the response of the liquid crystal is completed for the former frame periods. The response of the liquid crystal may be completed in the upper part of the liquid crystal display panel 10 which lies in the relatively former data addressing order, but the completion point of the response of the liquid crystal in the lower part of the liquid crystal display panel 10, which lies in the relatively latter addressing order, may be extended up to the latter frame periods. The reason why the same data L, R and L as the previous frame is repeatedly addressed for the latter frame periods is for compensating the stance maintaining force of the liquid crystal. The controller 11 controls the light sources to be turned on after 1.5 frame periods have elapsed from the initial data addressing point St1, St2 and St3 in the former frame periods till the latter frame periods end, in consideration of a time taken for all of the liquid crystal in the liquid crystal display panel 10 to complete its response due to the data L, R and L for the former frame periods. In addition, the controller 11 controls the left eye shutter STL to be opened and simultaneously the right eye shutter STR to be closed so as to overlap the periods when the light sources are turned on for the left eye frame periods Fn+1 and Fn+2, and Fn+5 and Fn+6. The controller 11 controls the left eye shutter STL to be closed and simultaneously the right eye shutter STR to be open so as to overlap the periods when the light sources are turned on for the right eye frame periods Fn+3 and Fn+4. At this time, the opening and closing point Ct1 of the shutters STL and STR is positioned in the periods when the light sources are turned off. In this way, if the turned-on timing of the light sources is adjusted along with the adjustment of the shutter opening timing, the 3D crosstalk can be considerably lowered. In addition, since the opening and closing point Ct1 of the shutters STL and STR is set to be positioned in the periods when the light sources are turned off, a timing margin can be notably improved when designing the opening and closing point Ct1 in consideration of the response of the liquid crystal in the liquid crystal shutter glasses 16.

Figure 4:
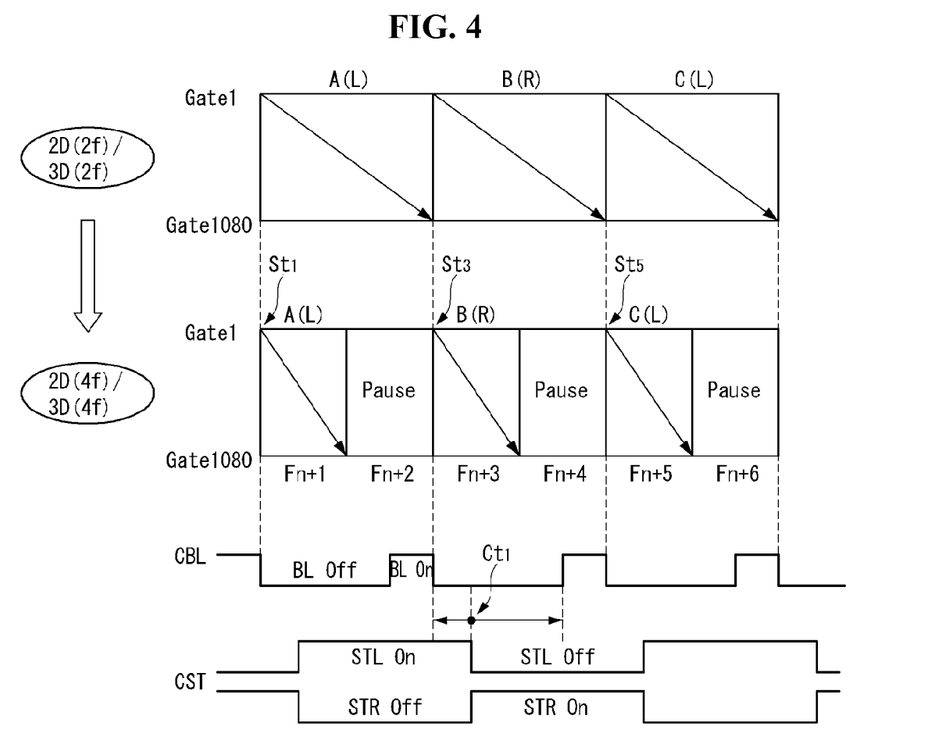

FIG. 4 shows a second embodiment of the light source control signal CBL and the liquid crystal shutter control signal CST corresponding to the addressing timing of the frame data.

In FIG. 4, the second embodiment has substantially the same operation and effect as the first embodiment except that the drivers 12 and 13 are paused for the latter frame periods Fn+2, Fn+4 and Fn+6. For the pause driving, the controller 11 may selectively stop the operation of the data driver 12 or the operation of the gate driver 13, or stop the operations of both of them. Such an alternating pause driving is advantageous in reducing the heat emission of the drivers 12 and 13 and the power consumption.

Figure 5:
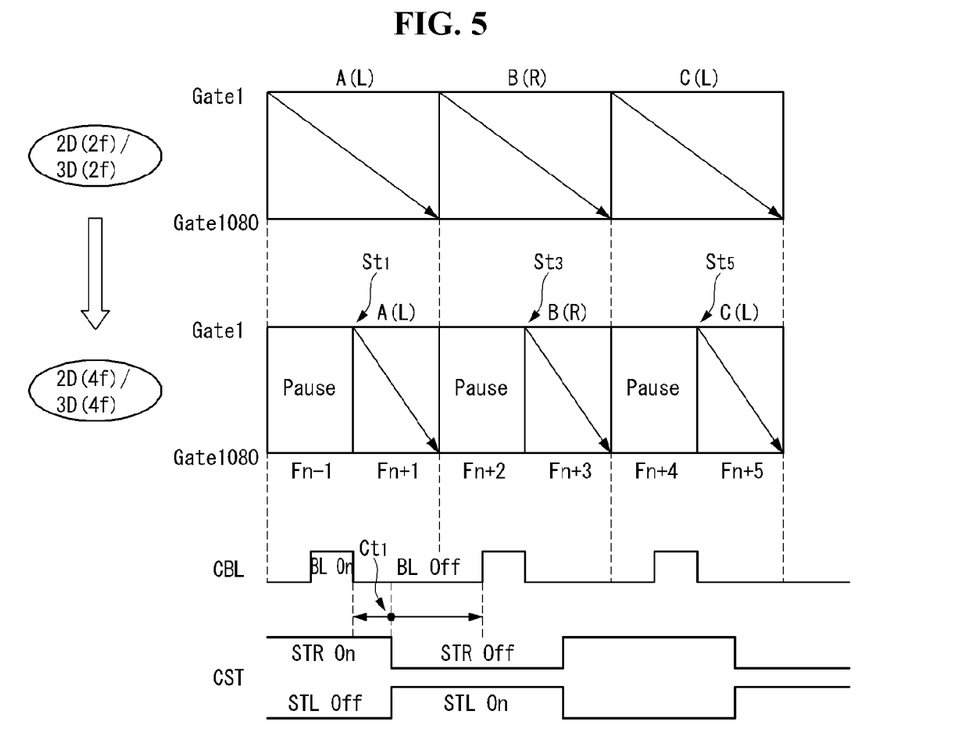

FIG. 5 shows a third embodiment of the light source control signal CBL and the liquid crystal shutter control signal CST corresponding to the addressing timing of the frame data.

In FIG. 5, the third embodiment has substantially the same operation and effect as the second embodiment except that the addressing timing of the frame data, and the driving timings of the light source control signal CBL and the liquid crystal shutter control signal CST are entirely shifted rightwards by one frame period.

Figure 6:
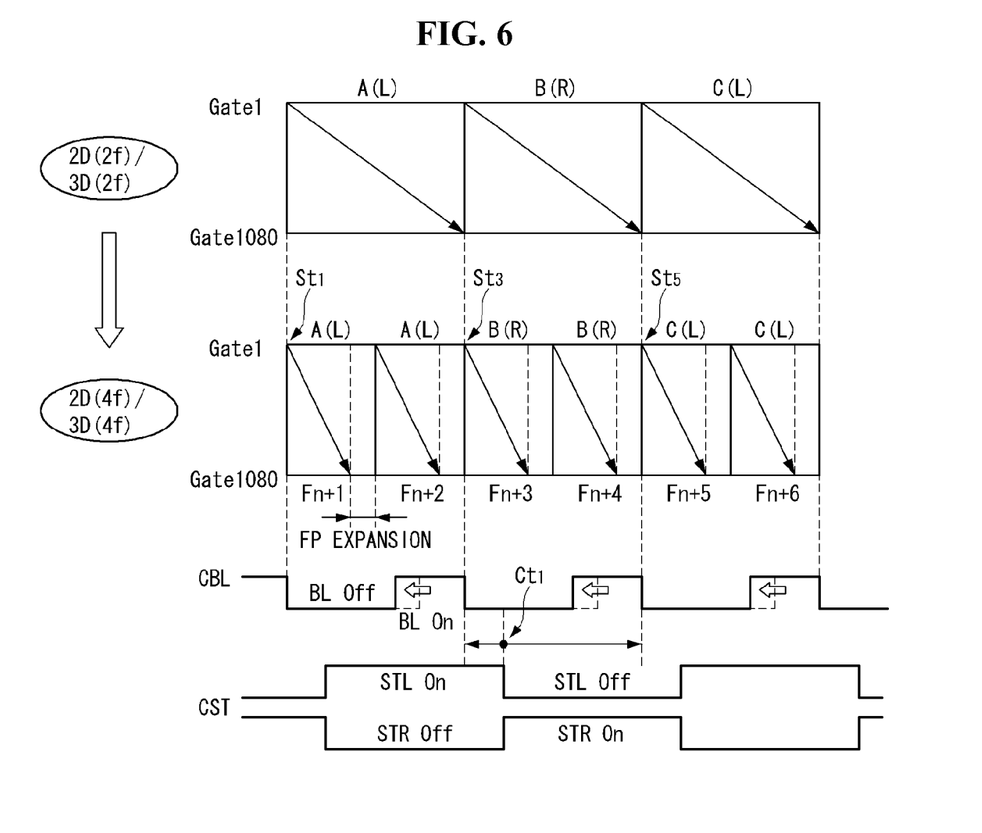

FIG. 6 shows a fourth embodiment of the light source control signal CBL and the liquid crystal shutter control signal CST corresponding to the addressing timing of the frame data.

In FIG. 6, the fourth embodiment is substantially the same as the first embodiment except that a front porch FP included in the vertical blank interval is expanded. Here, the data addressing begins when the data enable signal DE is a high level and stops when the data enable signal DE is a low level. The data enable signal DE changes its logic levels in synchronization with, for example, the horizontal synchronizing signal Hsync. The vertical blank interval corresponds to a interval when the low level of the data enable signal DE lasts relatively long. At this time, the front porch FP is defined as a time from a point of time when the data enable signal DE is changed into the low level in one frame period to a point of time when the one frame period ends. The controller 11 can expand the front porch FP by making earlier the point of time when the data enable signal DE is changed into the low level and reduce a time taken to address the frame data by increasing the data transmission frequency. Thereby, a time for the response of the liquid crystal is correspondingly increased in two frame periods used to display the same frame data. Therefore, the fourth embodiment can further increase a time for the turning-on of the light sources as compared with the first embodiment, thereby improving the brightness when 2D images or 3D images are implemented. According to the fourth embodiment, the light sources are turned on after 1.2 or 1.3 frame periods respectively have elapsed from the initial data addressing points St1, St2 and St3 in the former frame periods Fn+1, Fn+3 and Fn+5 till the latter frame periods end.

Figure 7:
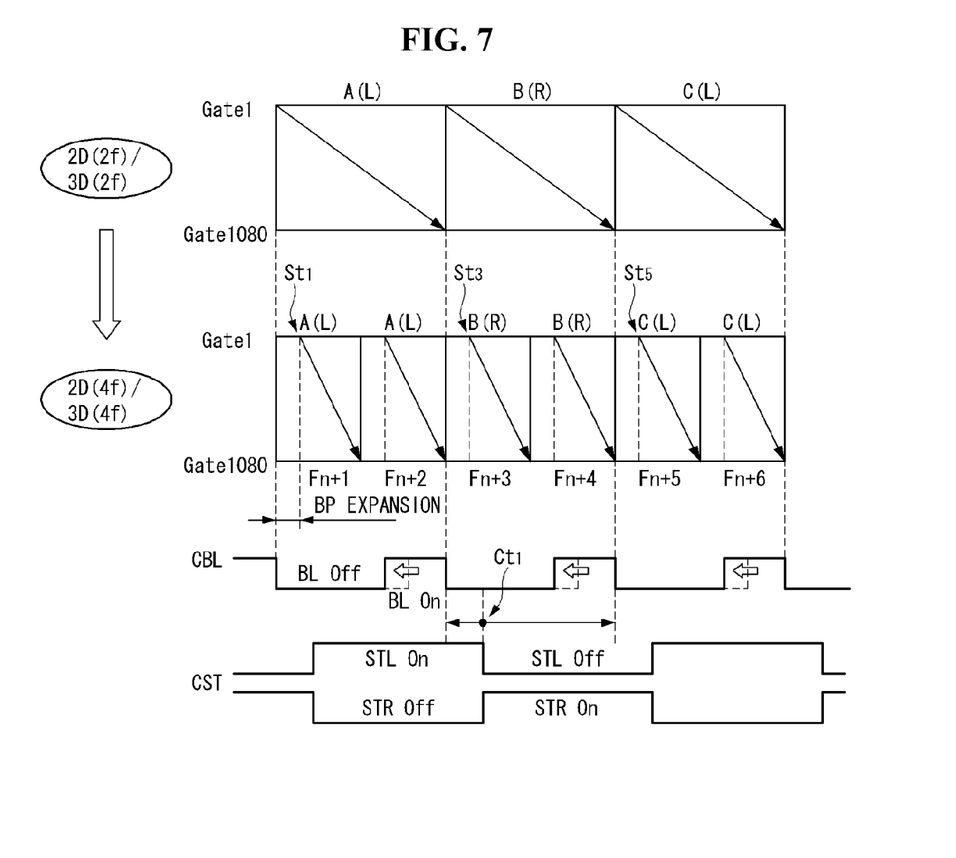

FIG. 7 shows a fifth embodiment of the light source control signal CBL and the liquid crystal shutter control signal CST corresponding to the addressing timing of the frame data.

In FIG. 7, the fifth embodiment has substantially the same operation and effect as the fourth embodiment except that a back porch BP included in the vertical blank interval is expanded. The back porch BP is defined as a time from a point of time when one frame period starts to a point of time when the data enable signal DE initially enters the high level. The controller 11 can expand the back porch BP by delaying the point of time when the data enable signal DE initially enters the high level, and reduce a time taken to address the frame data by increasing the data transmission frequency. Thereby, a time for the response of the liquid crystal is correspondingly increased in two frame periods used to display the same frame data. Therefore, the fifth embodiment can further increase a time for the turning-on of the light sources as compared with the first embodiment, thereby improving the brightness when 2D images or 3D images are implemented.

Figure 8:
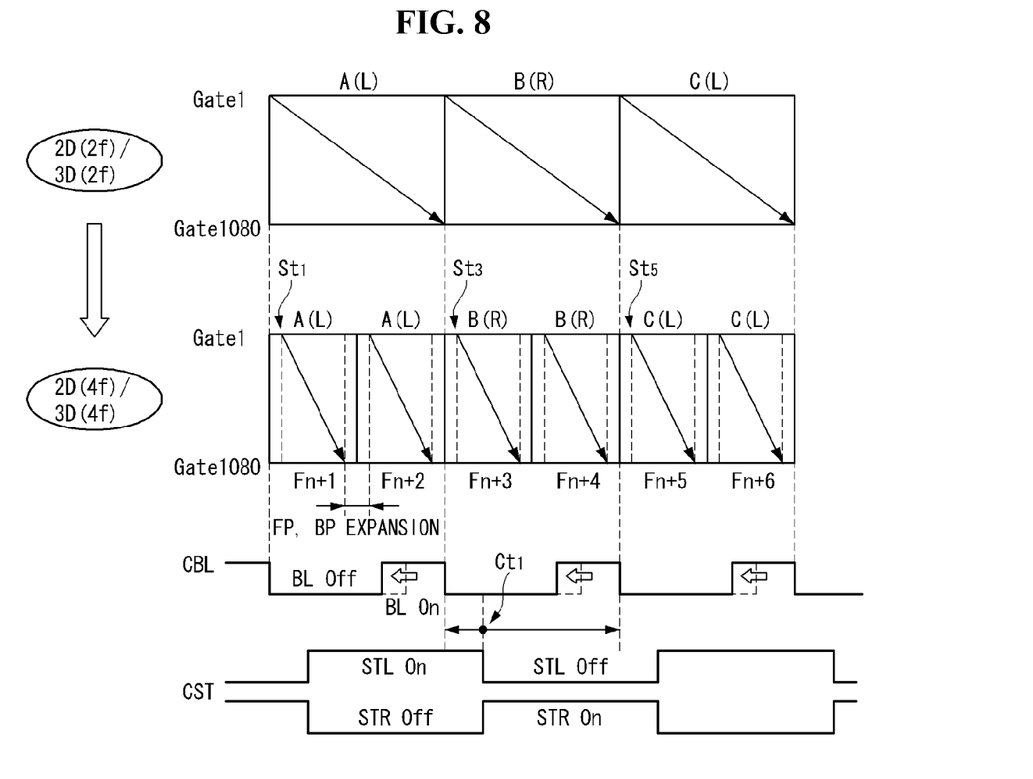

FIG. 8 shows a sixth embodiment of the light source control signal CBL and the liquid crystal shutter control signal CST corresponding to the addressing timing of the frame data.

In FIG. 8, the sixth embodiment has substantially the same operation and effect as the fourth and fifth embodiments except that the front porch FP and the back porch BP included in the vertical blank interval are all expanded.

Figure 9:
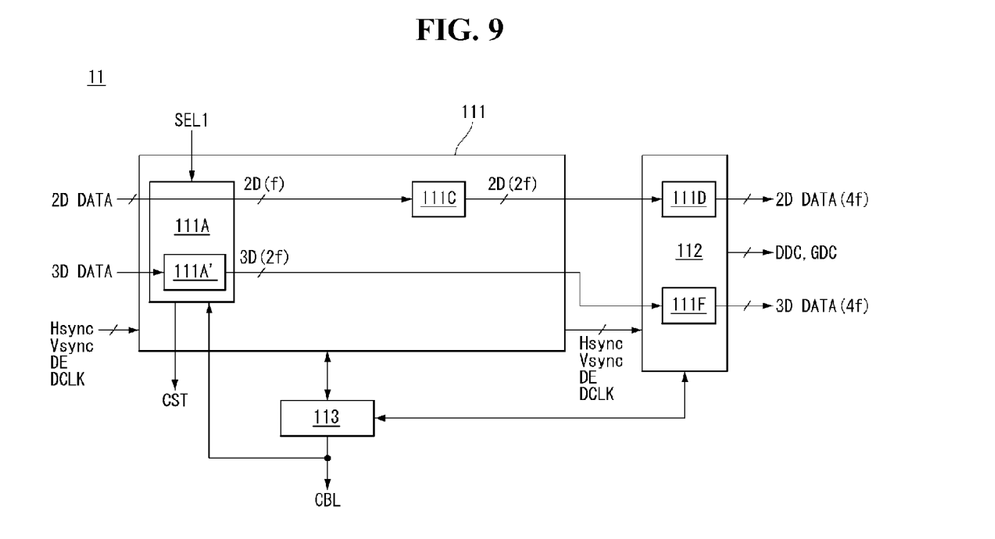
FIG. 9 is a block diagram illustrating another example of a controller.

FIG. 9 shows another example of the controller 11.

Referring to FIG. 9, the controller 11 comprises a data processing unit 111, a timing controller 112, and a light source control unit 113.

The data processing unit 111 selectively modulates 2D and 3D data to be synchronized with double frame frequency 2f. For this, the data processing unit 111 comprises a data selection unit 111A and a 2D data interpolation unit 111C. The configuration and operation of the data selection unit 111A are substantially the same as those of the data selection unit 111A in FIG. 2. The configuration and operation of the 2D data interpolation unit 111C are substantially the same as those of the first 2D data interpolation unit in FIG. 2.

The timing controller 112 has substantially the same operation as one in FIG. 2 except that the 2D data doubling unit 111D and the 3D data doubling unit 111F are embedded therein. The 2D data doubling unit 111D and the 3D data doubling unit 111F have substantially the same configuration and operation as those in FIG. 2.

The light source control unit 113 has substantially the same configuration and operation as one in FIG. 2.

As described above, the image display device according to the embodiments of this document can improve the MPRT when 2D images are implemented, and prevent 3D crosstalk from being generated when 3D images are implemented, thereby greatly improving the display quality.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims.

What is claimed is:

1. An image display device comprising:
    a liquid crystal display panel configured to selectively implement 2D images and 3D images;
    panel driving circuits configured to drive the liquid crystal display panel;
    a backlight configured to include a plurality of light sources and supply light to the liquid crystal display panel; and
    a controller configured to modulate input data to generate frame data synchronized with N (where N is a positive integer equal to or more than 4) multiple frame frequency, control the panel driving circuits such that same frame data are displayed in the liquid crystal display panel every two consecutive frame periods, control the backlight to be turned off for a former frame period of the two frame periods allocated to display the same frame data, and control the backlight to be turned on for a latter frame period of the two frame periods.

2. The image display device of claim 1, wherein the backlight is turned on at least one frame period later from an initial data addressing point in the former frame period, and the turned-on state lasts till the latter frame period ends.

3. The image display device of claim 1, wherein when the 2D images are implemented, the controller performs a data interpolation modulation and a data doubling modulation to generate the frame data.

4. The image display device of claim 1, wherein when the 3D images are implemented, the controller performs a data division modulation and a data doubling modulation to generate the frame data.

5. The image display device of claim 4, further comprising liquid crystal shutter glasses having a left eye shutter and a right eye shutter which are reversely opened and closed to each other while the backlight is turned off, in order to implement the 3D images.

6. The image display device of claim 1, wherein the controller repeatedly supplies the same frame data to the panel driving circuits for the former frame period and the latter frame period.

7. The image display device of claim 1, wherein the controller controls the driving circuits to be paused for either the former frame period or the latter frame period.

8. The image display device of claim 6, wherein the controller expands a front porch by making earlier a point of time when a data enable signal is changed into a low level, which instructs to stop addressing the frame data in one frame period, and increases a transmission frequency of the frame data.

9. The image display device of claim 6, wherein the controller expands a back porch by delaying a point of time when a data enable signal initially enters a high level, which instructs to begin addressing the frame data in one frame period, and increases a transmission frequency of the frame data.

10. The image display device of claim 6, wherein the controller expands a front porch by making earlier a point of time when a data enable signal is changed into a low level, which instructs to stop addressing the frame data in one frame period, expands a back porch by delaying a point of time when the data enable signal initially enters a high level, which instructs to begin addressing the frame data in one frame period, and increases a transmission frequency of the frame data.

* * * * *